United States Patent
Schultz et al.

(10) Patent No.: US 7,165,608 B2
(45) Date of Patent: *Jan. 23, 2007

(54) WELLBORE POWER GENERATING SYSTEM FOR DOWNHOLE OPERATION

(75) Inventors: Roger L. Schultz, Aubrey, TX (US); Michael L. Fripp, Carrollton, TX (US); Brock W. Watson, Carrollton, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/962,005

(22) Filed: Oct. 9, 2004

(65) Prior Publication Data

US 2005/0039921 A1    Feb. 24, 2005

Related U.S. Application Data

(63) Continuation of application No. 10/053,116, filed on Jan. 17, 2002, now Pat. No. 6,848,503.

(51) Int. Cl.
*E21B 4/04* (2006.01)

(52) U.S. Cl. .................. 166/66.5; 290/54; 310/156.01; 310/267

(58) Field of Classification Search ............... 166/66.5, 166/373, 313, 65.1; 290/43, 54, 1 R; 405/75; 310/267, 154.25
See application file for complete search history.

(56) References Cited

U.S. PATENT DOCUMENTS

| | | |
|---|---|---|
| 3,236,255 A * | 2/1966 | Sizer .......................... 137/494 |
| 3,342,267 A | 9/1967 | Cotter et al. |
| 3,867,655 A | 2/1975 | Stengel et al. |
| 4,488,055 A | 12/1984 | Toyama |
| 4,491,738 A | 1/1985 | Kamp |
| 4,520,273 A | 5/1985 | Rowe |
| 4,720,640 A | 1/1988 | Anderson et al. |
| 5,659,205 A | 8/1997 | Weisser |
| 5,696,419 A | 12/1997 | Rakestraw et al. |
| 5,839,508 A | 11/1998 | Tubel et al. |
| 6,153,944 A | 11/2000 | Clark |
| 6,173,771 B1 | 1/2001 | Eslinger et al. |
| 6,509,652 B1 | 1/2003 | Yumita |
| 6,518,680 B1 | 2/2003 | McDavid, Jr. |
| 6,848,503 B1 * | 2/2005 | Schultz et al. ............. 166/66.5 |
| 2001/0040379 A1 | 11/2001 | Schultz et al. |
| 2001/0045285 A1 * | 11/2001 | Russell .................... 166/332.3 |

* cited by examiner

*Primary Examiner*—David Bagnell
*Assistant Examiner*—Daniel P Stephenson
(74) *Attorney, Agent, or Firm*—Lawrence R. Youst

(57) ABSTRACT

A downhole tool (100) for wellbore operations comprises a substantially tubular member (130) that is operably positionable in the wellbore and a rotation member (110) that is rotatably disposed within the substantially tubular member (130). The rotation member (110) has a passageway (112) through which objects may pass into the wellbore. The rotation member (110) rotates about an axis of rotation (x) that is substantially perpendicular to the longitudinal axis (y) of the substantially tubular member (130) in response to fluid flow through the passageway (112). The rotation member (110) has magnetic properties such that rotation of the rotation member (110) generates a magnetic field that produces useable power.

36 Claims, 7 Drawing Sheets

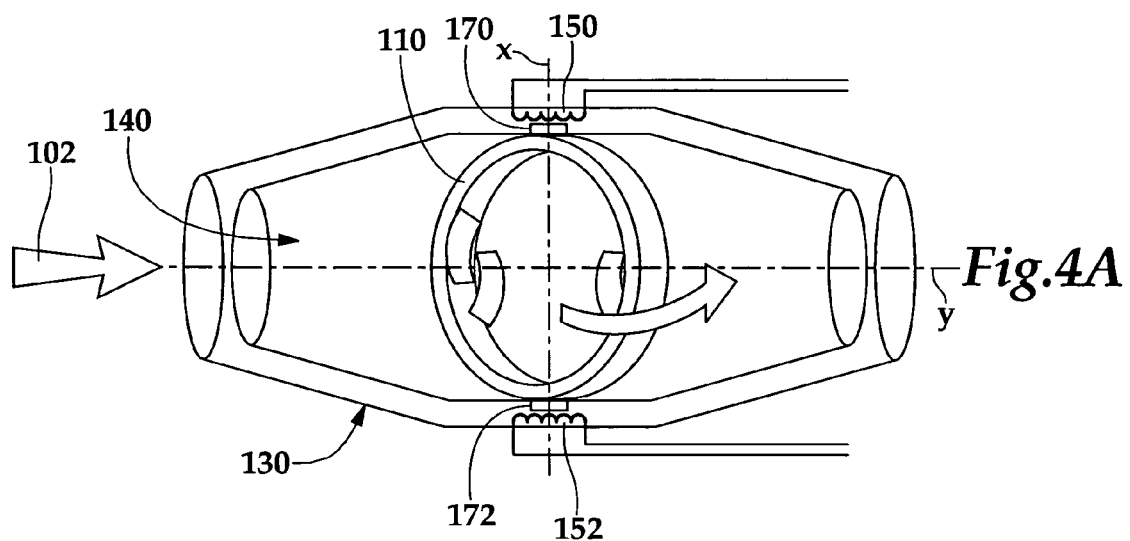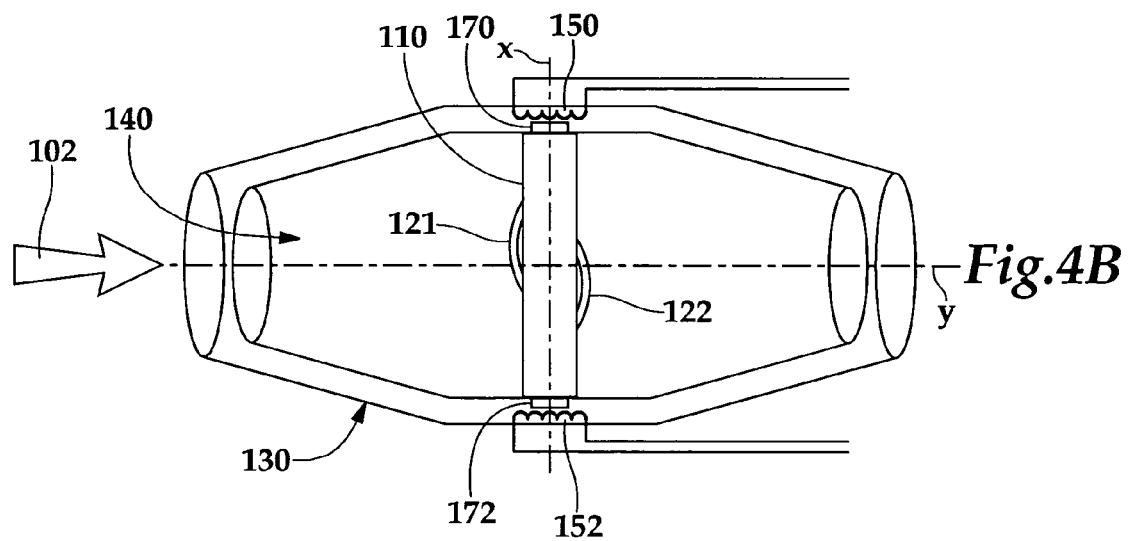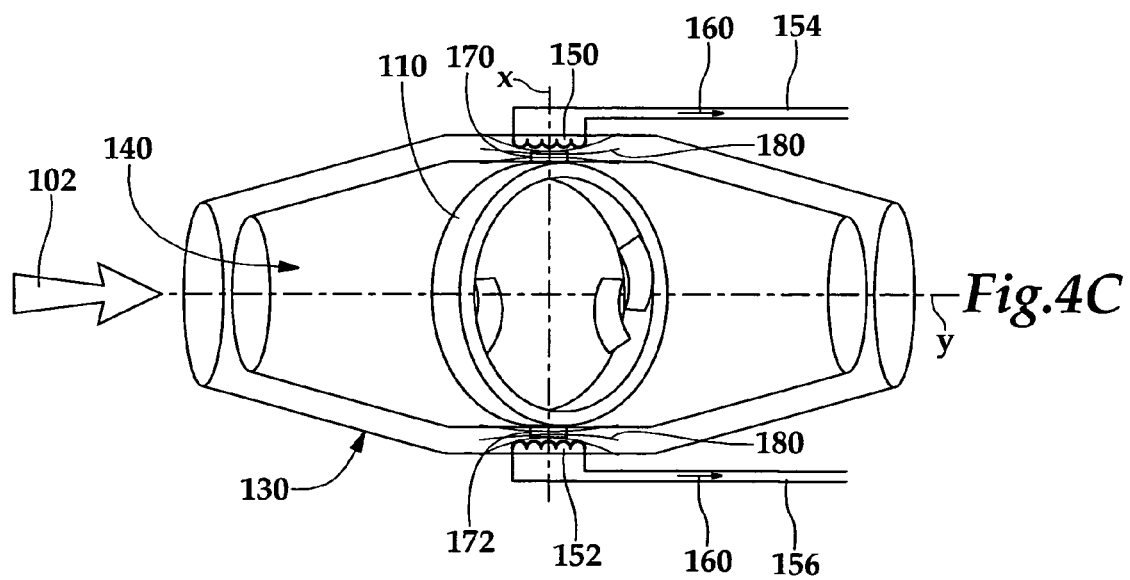

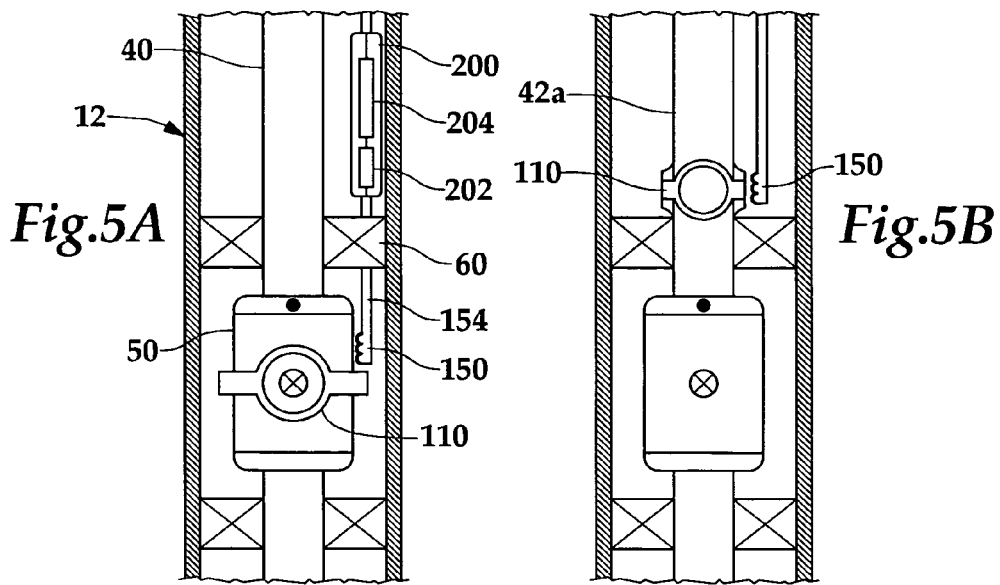
*Fig.5A*  *Fig.5B*
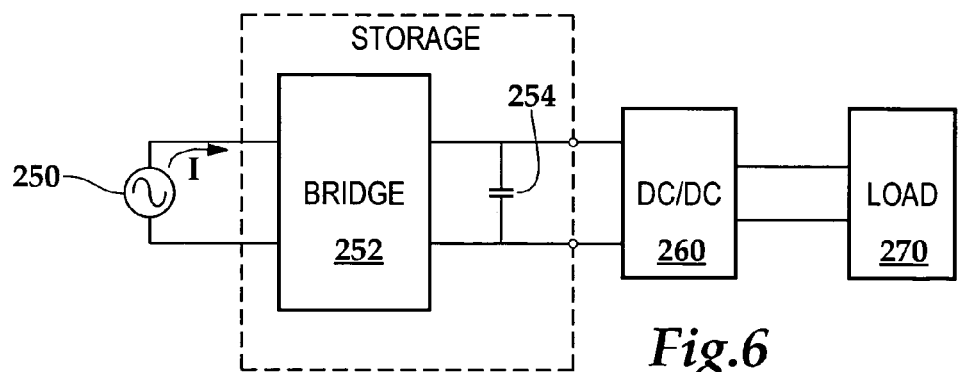
*Fig.6*
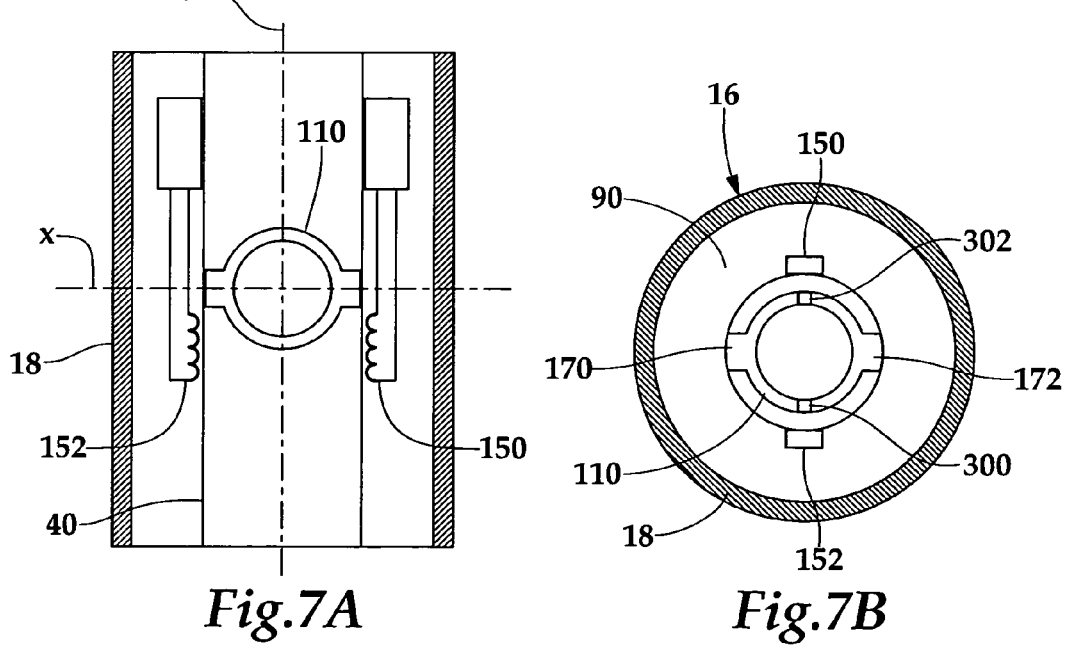
*Fig.7A*  *Fig.7B*

WELLBORE POWER GENERATING SYSTEM FOR DOWNHOLE OPERATION

CROSS-REFERENCE TO RELATED PATENT APPLICATIONS

This application is a continuation application of application Ser. No. 10/053,116 filed Jan. 17, 2002 now U.S. Pat No. 6,848,503 entitled Wellbore Power Generating System for Downhole Operation.

TECHNICAL FIELD OF THE INVENTION

The present invention relates, in general, to downhole operations that produce electrical power within a wellbore and, in particular, to a system for generating power from fluid flow through production tubing in a wellbore that imparts rotation to a magnetized rotation member that generates a magnetic field to produce useable power.

BACKGROUND OF THE INVENTION

Downhole well applications, such as those used to extract crude oil from one or more production zones underneath the earth's surface, often require downhole power in order to operate components such as pressure and temperature sensors in the well. Current systems requiring downhole power include intelligent wells and permanent gauge installations where sensors or actuators are used in order to operate chokes and restrict fluid flow into a well at different levels for multiple zone production. Such systems are often necessary for control of pressure and flow from various zones.

Prior art downhole power generating systems include the use of an umbilical to power sensors and actuators from the surface. A typical umbilical comprises a protected electrical tethered line that can be used to deliver both power and data to the component as well as other downhole devices requiring power. In addition, wireless telemetry methods have proven useful for communications and general interfacing with such components and as a means of facilitating data transmission between the surface operator and the downhole device. Finally, batteries and battery packs can be used for short term power applications.

While such downhole power systems have proven useful, they do not meet the long term power needs of modern day production operations. For example, while the use of an umbilical is suitable for providing power and data communications to devices, the practical difficulties related to their installation and maintenance limits their long term usefulness. At the same time, umbilical systems can interfere with and obstruct the well, production tubing, and other down hole structures by restricting passage of tools and other components into the wellbore. The use of wireless telemetry with batteries has been contemplated, but such systems suffer from an inability to provide useful levels of power or sustain power over long periods of time. Therefore, a long term downhole power solution that is suitable for use in a modern wellbore operation would provide numerous advantages.

SUMMARY OF THE INVENTION

The present invention provides a robust and efficient system for downhole power generation. The system utilizes a rotation member that operates on principles similar to those of a Darrieus rotor providing full access to the wellbore for passing tools into the wellbore. The airfoil is efficient, long lasting and can operate under a wide variety of flow conditions.

According to one embodiment, disclosed is a system for generating power from fluid flow in a wellbore. The system comprises a rotation member having a passageway through which objects may pass into the wellbore. A support mechanism is coupled to the rotation member inside the wellbore such that fluid flow through the passageway causes the rotation member to rotate. The rotation member is magnetized such that when it rotates it generates a magnetic field that produces usable power. Magnetic pickups are arranged about the rotation member within the magnetic flux lines of the magnetic field.

This system may further comprise a power conditioning unit and leads extending from magnetic pickups to a power conditioning unit such that a magnetic field generated by the rotational motion of the rotation member induces a current within the leads that is received by the power conditioning unit. The power conditioning unit may include a rectifier circuit to control the characteristics of the power generated by the rotation member.

The system may also comprise an output terminal coupled to the power conditioning unit and a lead extending from the output terminal to a component requiring power within the wellbore. The power conditioning unit may comprise one or more batteries, a capacitive bank, or a fuel cell adapted for storing the power generated by the rotation member. According to another embodiment, a starter rotor is provided comprising a pair of offset drag members which provide resistance to fluid flow within the wellbore and thereby facilitate rotation of the airfoil along the direction of fluid flow within the wellbore. A means of controlling the rotation of the rotation member may be provided, the means comprising a motor for starting and stopping the rotation of the rotation member and a control lead extending from outside the wellbore to the motor for allowing human operation of the motor from a point outside the wellbore.

Also disclosed is a power generating system for an oil producing operation having production tubing in a downhole wellbore. The system comprises a magnetized rotation member coupled to the wellbore within the production tubing, the rotation member having a passageway through which objects may be passed within the production tubing. A support mechanism couples the rotation member to the production tubing and allows the rotation of the rotation member within the production tubing. Magnetic pickups are predisposed about the rotation member within the wellbore and a power conditioning unit is provided with leads extending from the magnetic pickups to the power conditioning unit. The system operates such that fluid flow through the production tubing causes the rotation member to rotate and induce a magnetic field on the magnetic pickups such that electrical energy is produced and delivered to the power conditioning unit, the power conditioning unit capable of delivering usable power to any one of several electronic components within the wellbore.

The power generating system may further comprise a rectifier circuit for controlling the characteristics of the power stored in the power conditioning unit. A starter rotor may be used to assist the rotation of the rotation member, the starter rotor comprising a pair of offset and curved drag members which provide resistance to fluid flow within the wellbore and thereby facilitate rotation of the rotation member along the direction of fluid flow within the production tubing. In one embodiment, a DC-to-DC converter circuit is provided for delivering a stable DC voltage.

Also disclosed is a system for extracting fluids from a plurality of production zones intersected by a wellbore, the system including downhole power generation. The system comprises production tubing extending along a substantial length of the wellbore, the production tubing including at least one valve at each of the plurality of production zones with passages extending from the production zones to each valve permitting the flow of fluid from the plurality of production zones into the production tubing via the valve. The system further comprises at least one magnetized rotation member coupled within the production tubing and predisposed to make contact with fluid flowing through the production tubing as a valve opens to permit fluid to flow from a production zone, the rotation member having a passageway through which objects may pass into the wellbore via the production tubing, wherein fluid flow through the passageway causes the rotation member to rotate thereby generating a magnetic field that produces useable power.

In one embodiment, the system further comprises a rotation member at each production zone intersected by the wellbore. The rotation members may be coupled together in series or parallel for high voltage and/or high current applications.

An advantage of the present invention is that it provides full access to the components in the wellbore and does not restrict the diameter of the production tubing, allowing tools to pass through the wellbore without clogging.

Another advantage of the present invention is that the rotation member provides a downhole power generation system with a relatively long life compared to umbilical systems and batteries.

Still another advantage of the present invention is the ability to provide downhole electrical power for long periods of time.

BRIEF DESCRIPTION OF THE DRAWINGS

The above advantages and specific embodiments will be understood from consideration of the following detailed description taken in conjunction with the appended drawings in which:

FIGS. 4A, 4B, and 4C illustrate use of the downhole power generating system of the present invention;

FIGS. 5A and 5B show two configuration of the rotation member according to the present invention;

FIG. 6 is a circuit schematic of a power generating system;

FIGS. 7A and 7B illustrate the positioning of an rotation member within production tubing;

Figure 1:
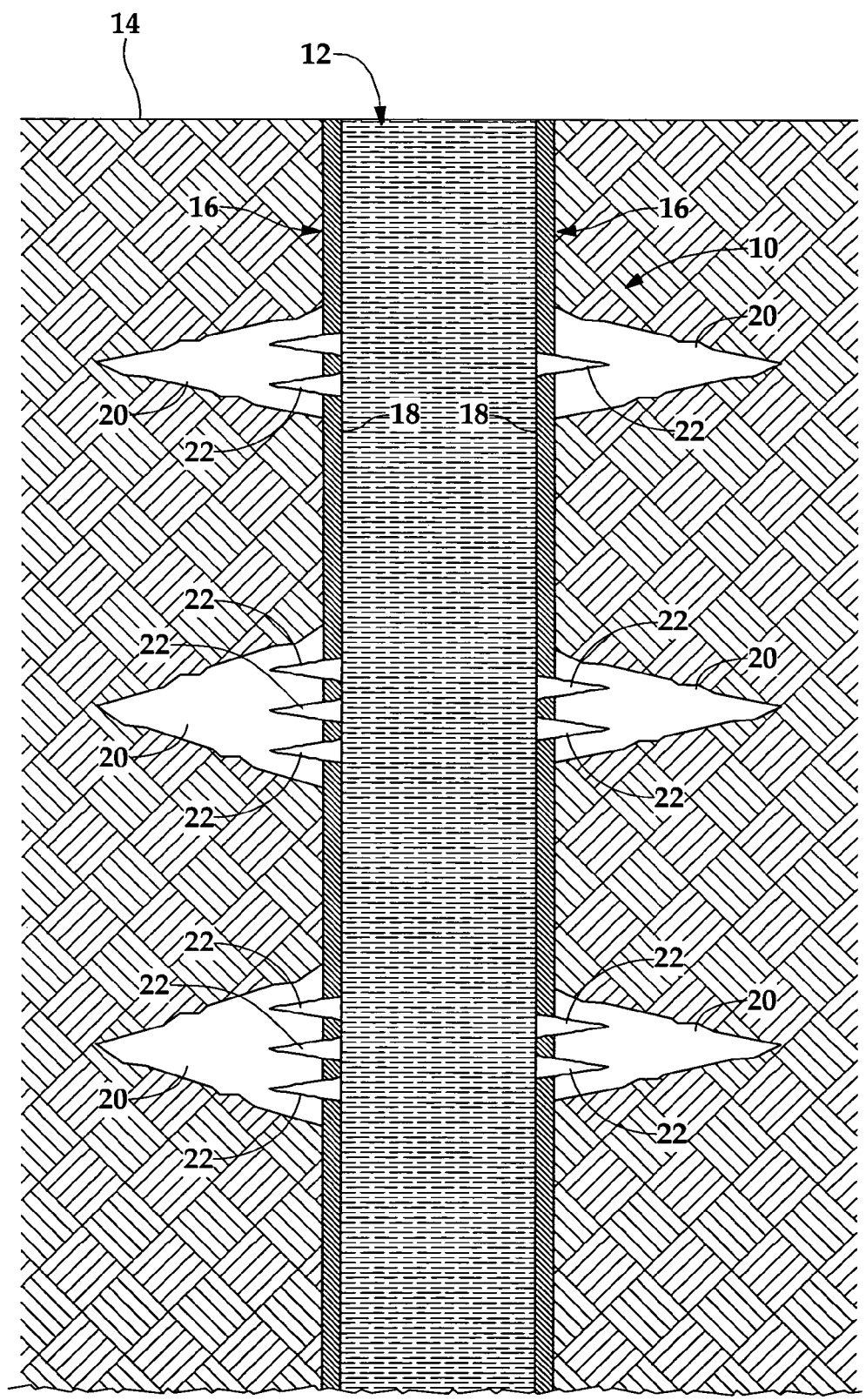
FIG. 1 is a figure illustrating a typical wellbore intersecting a plurality of production zones.

References in the detailed description correspond to like references in the figures unless otherwise indicated.

DETAILED DESCRIPTION OF THE INVENTION

The present invention provides a system for generating power within a wellbore and, more specifically, a downhole operation utilizing production tubing to remove fluids, such as crude oil, from one or more production zones underneath the earth's surface. With reference now to the figures, and in particular to FIG. 1, therein is shown a typically downhole operation, denoted generally as 10, in which the present invention may be utilized. In essence, the downhole operation 10 provides an excavation underneath the earth's surface 14 which is created using well known techniques in the energy industry. The operation 10 includes a wellbore 12 with wall 16 lined with casing 18 which has a layer of cement between the wellbore 12 and the casing 18 such that a hardened shell is formed along the interior of the wellbore 12. For convenience, the singular and plural of a term ("passageway" and "passageways", "zone" or "zones", "sleeve" or "sleeves", "packer" or "packers", etc.) will be used interchangeable throughout and with the same reference number associated with both forms of the term.

FIG. 1 also shows a plurality of production zones 20 in which drilling operations are concentrated for the extraction of oil. Each production zone 20 is shown to have one or more passageways 22 leading from the production zone 20 to the interior of the wellbore 12. The passageways 22 allow a flow of fluid from a production zone 20 into the wellbore 12 for extraction using methods well known to those of ordinary skill. Typically, the excavation of a wellbore, such as wellbore 12, is a time consuming and costly operation and involves the drilling underneath the surface 14 to great depths. Therefore, it is expected that the wellbore 12 will be utilized for a relatively long period of time such that the operator can justify the investment in time and money.

Figure 2:
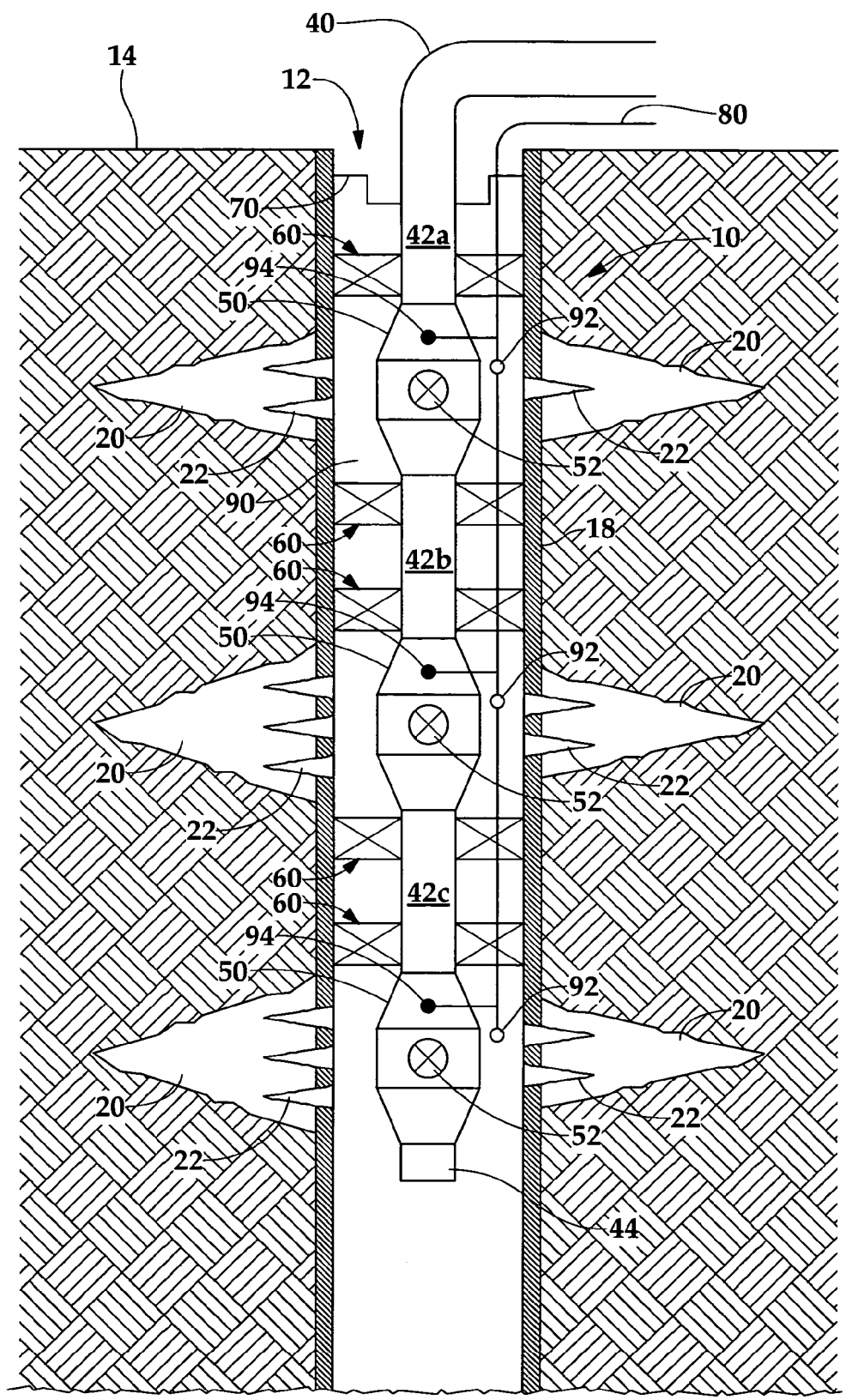
FIG. 2 shows a downhole operation with production tubing installed.

Turning now to FIG. 2, therein is shown an example downhole operation with production tubing 40 installed within the wellbore 12. Essentially, the production tubing 40 provides the means of extracting fluids from the production zones 20 via a passageway extending underneath the surface 14 to above the earth. As shown, production tubing 40 consists of tube sections 42A, 42B, 42C with end 44, although the production tubing 40 may consist or more or less segments. The sections 42A, 42B, 42C are joined together with sleeves 50, each sleeve 50 being contained in an area defined by packers 60, the use of which are well known in the industry. The physics governing the flow of fluids from a production zone 20 through the production tubing 40 is well known. As described below, the present invention utilizes the pressure regions defined by the packers 60 to provide the power generation functions of the present invention.

Seal 70 caps the production tubing 40 near the surface 14 of the downhole operation 10. Each sleeve 50 has a corresponding valve 52 which can be operated via control lead 80 which provides a cable and means for passageway and closing valves 52. In this way, the wellbore operator is able to control the flow of oil from any one of the available production zones 20 at any given time and at a desired level underneath surface 14. Thus, the basic components of an oil drilling operation suitable for extracting oil from production zones 20 have been described.

Still referring to FIGS. 1 and 2, the control lead 80 runs within an area known as an annulus 90 between the casing 16 and the production tubing 40. The control lead 80 is operably coupled to sensors 92 which are positioned at different levels of the wellbore 12 about corresponding production zones 20. In addition, the control lead 80 is operably coupled to chokes 94 which are used to operate corresponding valves 52, and thereby restrict fluid flow into the wellbore 12 at different levels, permitting production out of multiple zones intersected by the production tubing 40. As is well known in the art, by controlling fluid flow in this manner, the wellbore operator can have production from both a high pressure zone and a lower pressure zone. Moreover, by placing valves 52 at various levels where oil producing formations are found, oil can be extracted using a singular piece of production tubing 40, thereby optimizing the production operation for multiple zones at the same time and over a relatively long period of time.

Given that a typical wellbore operation, such as downhole operation 10, is in use for years, it is often necessary to provide power to various components and devices within the wellbore 12, but it may not be possible or desirable. Examples of such components include the sensors 92, chokes 94, and valves 52 used to control fluid flow. Prior art systems for power generation within the wellbore 12 include umbilical systems, batteries, and wireless telemetry, among others. The problems associated with such prior art power generation system are discussed above and relate generally to their inability to provide a long term source of power that does not interfere with production operations and allows the operator complete access to the wellbore 12 and production tubing 40. For example, while the control lead 80 can be placed within an electrical tethered line that forms an umbilical into the passageway formed by the wellbore 12, running such a line through the packers 60, and through the entire length of the wellbore 12 can be a complicated and time-consuming task.

Moreover, while the data and control interface to the sensors 92 may be achieved using wireless telemetry, power must still be provided with a physical line coupled to the electrical components in the wellbore 12. Apart from the difficulties of running a power line within the wellbore 12, there is the added consideration that a physical line consumes space and therefore may interfere with access to the wellbore 12 and/or restrict the diameter of the wellbore 12 such that tools cannot pass into the wellbore 12. At the same time, once the production tubing 40 is in place within the wellbore 12, it may not be possible or desirable to remove the tubing 40 in order to replace sensors 92 or batteries needed to power them. Thus, what is needed is an efficient and robust solution for downhole power generation.

The present invention provides a way of powering components, such as sensors 92, chokes 94, and valves 52 within the wellbore 12 of a typical oil producing operation, such as downhole operation 10. With the present invention, a downhole power generation system is provided that allows electrical power to be generated for a long period of time (5 to 10 years, for example) without disturbing the production tubing 40 or restricting access to the wellbore 12. While the invention is described as useful in providing power to component in a well, such as wellbore 12, it should be understood that the principles disclosed may have application in numerous production systems such as those where you may use more than one well or where you have multi-lateral wells.

Figure 3:
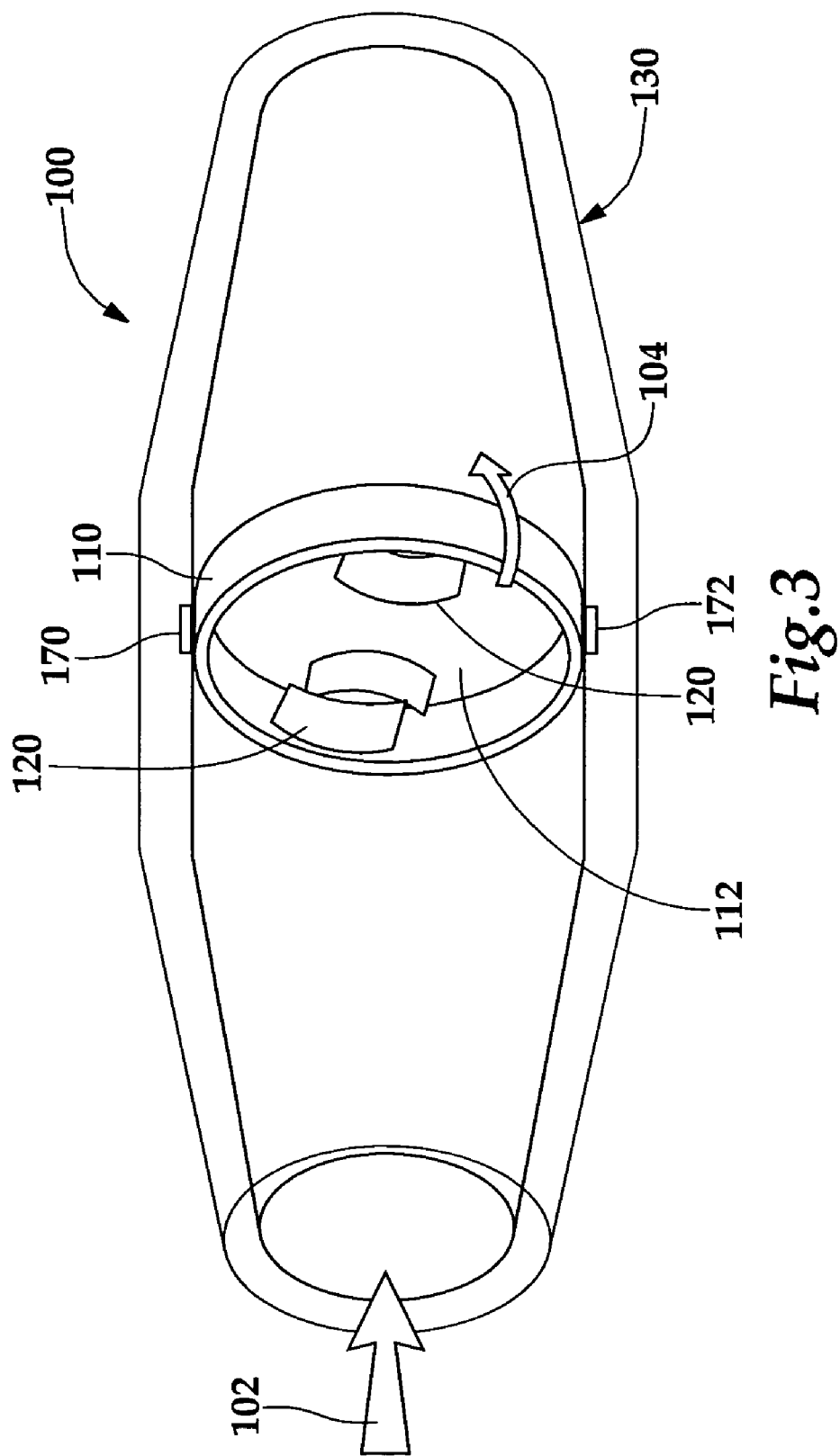
FIG. 3 illustrates a magnetized rotation member according to the present invention.

Therefore, having described the components and general aspects of a typical downhole operation, reference is made to FIG. 3, which illustrates the downhole wellbore power generation system, denoted generally as 100, according to the invention. Power generation system 100 can be used to generate electrical power from fluid flow, such as crude oil, through production tubing 40. As shown, the power generation system 100 includes a rotation member 110 with a passageway 112 through which objects may be passed. The passageway 112 facilitates the passage of tools into the wellbore 12 and, specifically, through the production tubing 40.

The downhole power generation system 100 operates on similar principles as a Darrieus rotor. Fluid flow, indicated by arrow 102, causes the rotation member 110 to rotate in the direction of arrow 104 which, in turn, generates a magnetic field which induces a current. The rotation member 110 comprises a rotation member or may be formed from two (2) arched and semi-circular arms that join at the first and second braces 170, 172 which provide a support mechanism for the rotation member within the production tubing 40. The braces 170, 172 are but one form of a suitable support mechanism and those skilled in the art will readily recognize that other ways of supporting the rotation member 110 may be employed, such as a U-shaped hold, or single brace arm. Braces 170, 172 provide free rotation of the rotation member 110 in the direction of arrow 104. No specific means of rotation is required, although internal bearings (not shown) may be used to provide rotation as well as other designs as would be well understood by those of ordinary skill in the art.

In one embodiment, the rotation member 110 is made of a magnetic material. Alternatively, one or more magnets may also be attached to or otherwise connected to or within the rotation member 110 to create the desired field effects. In addition, one or more starter rotors 120 may be provided to assist the rotation member 110 during initial rotation after the onset of fluid flow. As shown, the power generation system 100 is contained within a section 130 of the production tubing 40 such as, for example, a sleeve 50 between two packers 60.

It should be understood that the rotation member 110 can be used not only in production wells, but in injection wells such as those where water floods or steam floods are used, to produce power in those wells. Furthermore, the rotation member 110 can also be located in the annulus section of the well to be turned by lift gas that is injected down the annular which, as is well known in the art, is used to help lift the production fluids. Thus, any type of fluid moving through the well can be used to cause the rotation member to produce energy. Moreover, it will be readily appreciated that the rotation member 110 may be used in lateral wells as opposed to or in combination with the main well fork to keep the rest of the well bore clear and to provide easier access for getting tools in and out to all of the various laterals.

With reference to FIGS. 4A, 4B, and 4C, the rotational motion of the rotation member 110 within production tubing 40 is illustrated in more detail. FIG. 4A shows rotation member 110 partially blocking passageway 140 of section 130 of the production tubing. As fluid flows through passageway 140, it is caught by the starter rotor 120 which is configured to translate the pressure of the fluid flow to the rotation member 110. As seen more clearly in FIG. 4B, the starter rotor 120 is comprised of a pair of offset and curved drag members 121, 122 which provide resistance to fluid flow within the wellbore 12 and thereby facilitate rotation of the rotation member 110 along the direction of fluid flow. Rotation member 110 is fixed about an axis of rotation X within the production tubing 40 such that it rotates from a position of partial obstruction (FIG. 4A) to no obstruction (FIG. 4B). As shown, the axis of rotation X lies substantially perpendicular to the lengthwise axis Y of the wellbore 12 and production tubing 40. Thus, full access to the wellbore 12 is maintained in at least one position of the rotation member 110. Braces 170, 172 provide rotation points and couple the rotation member 110 to section 130.

Magnetic pickups 150, 152 are positioned about the rotation member 110 and configured to translate the rotational motion of the rotation member 110 into electric energy in the form of current 160. A magnetic field 180 is generated by the rotational action of the rotation member 110 which induces current 160 which traverses leads 154 and 156 extending from the magnetic pickups 150, 152 to a load or to a power conditioning unit for storage and rectification. Preferably, the rotation of the rotation member 110 can be operator controlled from the outside such that the rotation member 110 can be maintained in the open position (FIG. 4B) permitting full access to the wellbore 12 and passage of tools. Since the rotation member 110 and other components are self-contained and can be made using high strength and long lasting materials, the power generation system 100 of the invention is robust and efficient.

With reference to FIGS. 5A and 5B, therein is shown the use of the downhole power generating system 100 of the present invention according to different configurations. Specifically, in FIG. 5A the rotation member 110 is located within a sleeve 50 of the production tubing 40 inside the wellbore 12. Also, the magnetic pickup 150 extends from an area outside the sleeve 50 but within the distance of the magnetic flux lines of the field 180 produced by the rotation member 110 as it rotates. The magnetic pickup 150 has lead 154 extending through packer 60 and coupled to power conditioning unit 200 where current induced on the magnetic pickup 150 is delivered. The power conditioning unit 200 can include power storage 202 and a rectifier circuit 204 that provide the ability to store and deliver a steady power value for use by a load, such as a sensor 92 within the wellbore 12. Many forms of a suitable power storage 202 are envisioned including batteries, a capacitive bank, or fuel cell, as examples.

FIG. 5B shows the positioning of the rotation member 110 about tube section 42A of the production tubing 40. In this location, the rotation member 110 can be positioned anyplace where fluid flow is encountered thereby providing simple installation and the ability to place multiple rotation members 110 through the wellbore 12. The use of multiple rotation members is illustrated in more detail in FIGS. 8 and 9.

FIG. 6 is a circuit diagram of the power generating system of the present invention. Current I is generated by source 250 coupled to bridge circuit 252. The bridge circuit 252 provides an interface between the power storage and the source 250. As shown, the power storage is a capacitor 254 although other forms of storing a charge, such as a battery or fuel cell, may be used. A DC-to-DC converter circuit 260 is capable of rectifying the energy stored in capacitor 254 and delivering a steady amount of power to load 270 representing the electrical component inside the wellbore 12 to be powered.

FIGS. 7A and 7B illustrate the placement of the rotation member 110 within production tubing 40. Line X intersects the rotation member 110 about its axis of rotation which is substantially perpendicular to the lengthwise axis Y of the wellbore 12 and production tubing 40. FIG. 7B shows the cross-section of the rotation member about line X and in particular how the magnetic pickups 150, 152 can be located to be adjacent to the rotation member 110. The magnetic pickups 150, 152 fit in the area between the casing 18 and the production tubing 40 known as the annulus 90. Since no obstruction of the annulus 90 and the production tubing 40 takes place, full access to the wellbore 12 is provided. As shown, magnets 300, 302 are attached to the rotation member 110 at a location near the magnetic pickups 150, 152.

Figure 8:
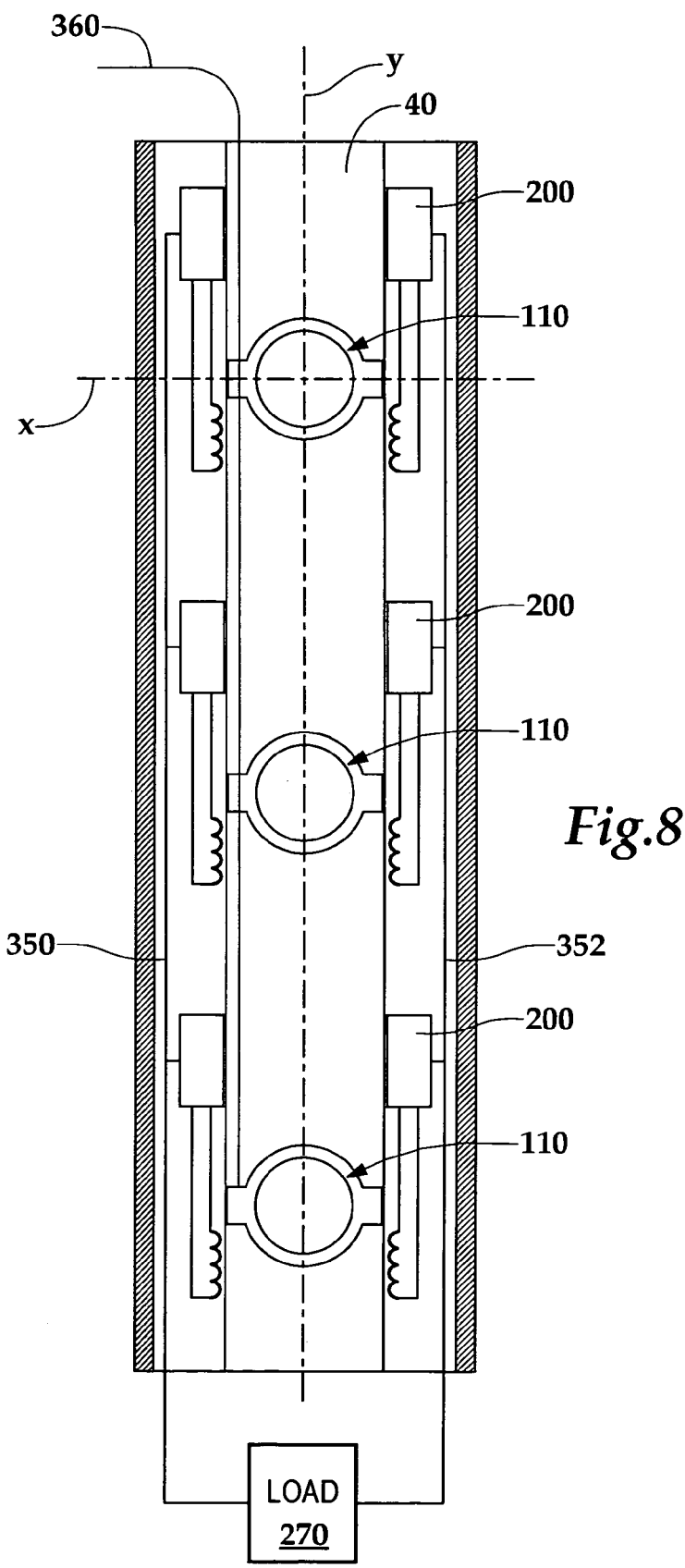
FIG. 8 show the use of multiple rotation members for generating downhole power.

Therefore, the present invention provides a power generating solution that may be configured according to the power needs of the downhole operation. For example, FIG. 8 shows the use of multiple rotation members 110 within the production tubing 40 of a wellbore, the rotation members 110 coupled to each other via leads 350 and 352 and extending to load 270. Thus, rotation members 110 may be stacked in a series or parallel configuration for high voltage and/or high current applications as required by the load 270. Moreover, the current generated by the rotation members 110 may be controlled via control lead 360 which couples one or more of the rotation members 110 within and allows operator control of the rotating action of the rotation members 110 from above the earth's surface. In this way, an operator can control when one or more of the rotation members 110 start and stop rotation as well as the speed of rotation which, in turn, controls the strength of the magnetic field and the amount of current induced in the magnetic pickups.

Figure 9:
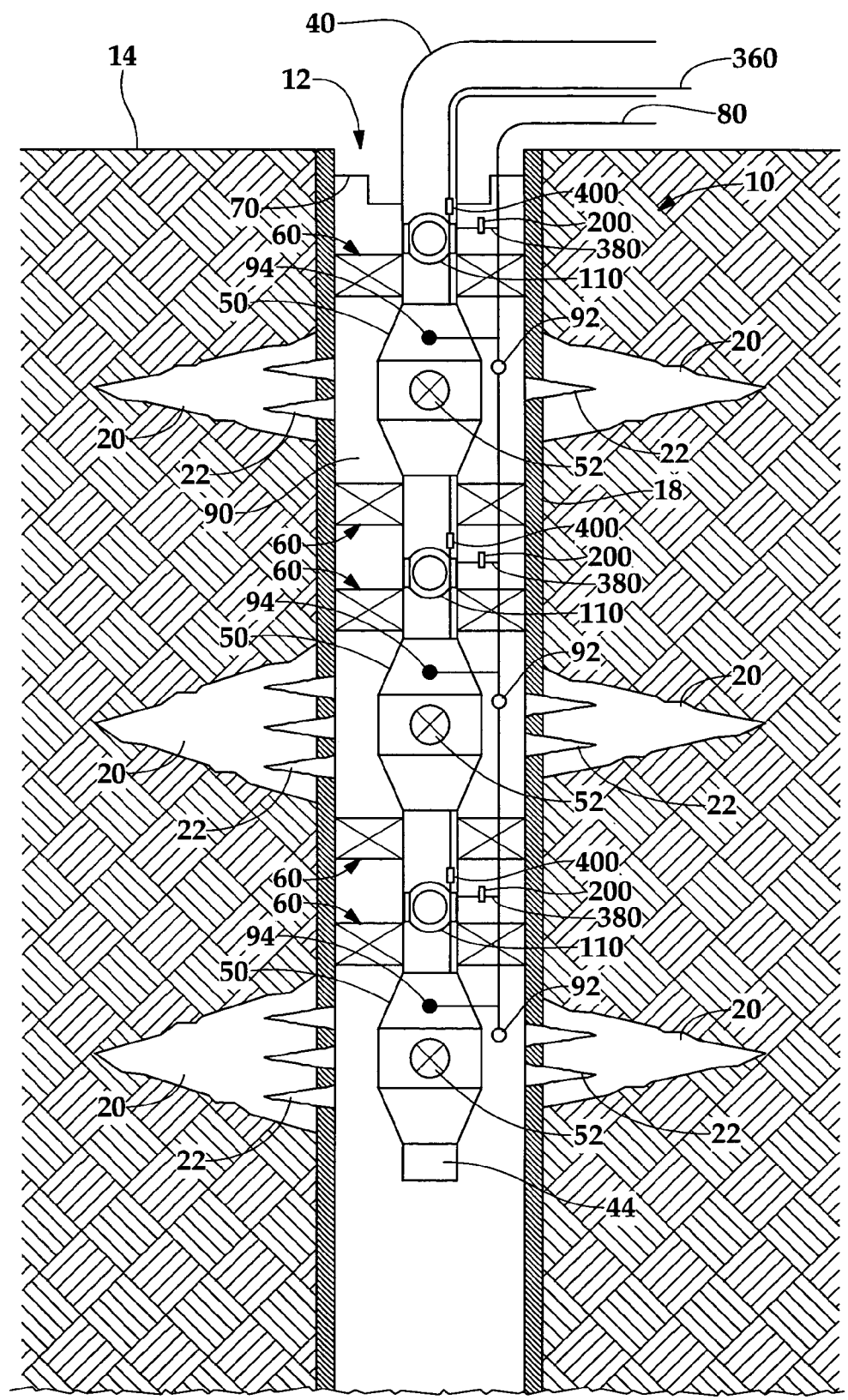
FIG. 9 illustrates a downhole operation for extracting fluids such as crude oil from a plurality of production zones intersected by a wellbore having a system for downhole power generation according to the invention.

FIG. 8 shows each rotation member 110 having its own power conditioning unit 200. It should be understood, however, that other ways of conditioning the power generated by the rotation members 110 may be employed. For example, a single power conditioning unit 200 may be sufficient to service all rotation members 110 according to the electrical power needs of the downhole operation. FIG. 9 shows the use of multiple rotation members 110 in place within the production tubing 40 of a downhole operation with control lead 360 extending through the production tubing 40 and to each rotation member 110. An electromechanical motor 400 is provided and coupled to the control lead 360 for starting and stopping the rotating action of the rotation members 110 as well as speed of rotation. Activation of the rotation member 110 can be done achieved either by surface control or in response to sensors and control systems down hole. If done from the surface, it can be done by any of a number of methods all well known in the art, such as direct hard wire connection, hydraulic lines, acoustic telemetry, radio wave signals, pressure pulses or changes, etc. Likewise, the rotation member 110 may be turned ON and OFF in response to conditions down hole or as needed by equipment down hole, and may be activated or de-activated based upon those needs. For instance, if a high percentage of water is being detected coming in from one zone, the rotation member 110 can be activated by a down hole command and the control system can activate the rotation member to generate power to be used to shut the sliding sleeve and cut off the intruding water.

As shown, each rotation member 110 is associated with its own power conditioning unit 200, although other configurations may be used. Also, each power conditioning unit 200 has an output terminal 380 leading to a component requiring power, in this case sensors 92. Thus, the present invention provides a system for extracting crude oils, or other fluids, from a plurality of production zones 20 intersected by a wellbore 12 with downhole power generation.

It should be understood that the fluid moving past the rotation member 110 can come from a number of sources besides those discussed above. For example, the fluid may come from injected fluid, such as lift gas, or steam, or water used for flooding for secondary recovery purposes. The fluid movement can also be from fluid being moved from one zone in the well bore to another, as in the case where water comes out of a down hole oil water separator that's being transferred down and pumped into, or transferred to and pumped into a disposal zone at some other location within the well bore.

Moreover, while the rotation member 110 is shown located within the production tubing 40, the rotation member 12 may be located in other locations of the well bore that allows fluid movement, i.e. where sufficient fluid movement occurs and where enough space is found to hold a rotation member 110. For instance, the rotation member 110 may be located in the annular space where lift gas is being pumped in or possibly in the perforations or sliding sleeve ports where production fluid is entering the tubing 40 or annular areas.

Likewise, the invention can also be used in drilling systems to provide power down hole to operate the usual devices that are well known in the art in drilling operations such as, but not limited to, the directional drilling motors, logging equipment, data transmission equipment, etc. The rotation member 110 could be positioned in the general vicinity of the tools to minimize the transmission distance necessary, although other configurations may also be employed. Moreover, a downhole power generating system according to the present invention may work equally well with whatever type of drilling fluid is being used, including drilling muds and foams.

Therefore, the embodiments shown and described above are only exemplary. Even though numerous characteristics and advantages of the present invention have been set forth in the foregoing description together with details of the invention, the disclosure is illustrative only and changes may be made within the principles of the invention. It is therefore intended that such changes be part of the invention and within the scope of the following claims.

What is claimed is:

1. A downhole tool for wellbore operations comprising:
a substantially tubular member having a longitudinal axis, the substantially tubular member operably positionable in the wellbore; and
a rotation member rotatably disposed within the substantially tubular member, the rotation member having a passageway through which objects may pass into the wellbore, the rotation member rotating about an axis of rotation substantially perpendicular to the longitudinal axis and generating a magnetic field that produces useable power in response to fluid flow through the passageway.

2. The downhole tool as recited in claim 1 wherein at least a portion of the rotation member has an airfoil shape.

3. The downhole tool as recited in claim 1 wherein the rotation member further comprises a substantially tubular rotor.

4. The downhole tool as recited in claim 1 wherein the rotation member has magnetic properties.

5. The downhole tool as recited in claim 4 wherein the rotation member further comprises a magnetic material.

6. The downhole tool as recited in claim 4 further comprising at least one magnet coupled to the rotation member.

7. The downhole tool as recited in claim 1 further comprising at least one magnetic pickup operably associated with the rotation member that senses the magnetic properties of the rotation member as the rotation member rotates, the magnetic pickup transforming the rotating action of the rotation member into electrical energy.

8. The downhole tool as recited in claim 1 further comprising a support member coupling the rotation member within the substantially tubular member.

9. The downhole tool as recited in claim 1 further comprising a starter rotor coupled to the rotation member and configured to assist the rotation of the rotation member within the substantially tubular member.

10. The downhole tool as recited in claim 9 wherein the starter rotor further comprises a pair of offset and curved drag members that provide resistance to fluid flow through the passageway, thereby facilitating rotation of the rotation member about the axis of rotation.

11. The downhole tool as recited in claim 1 further comprising a control adapted for activating the rotation member.

12. The downhole tool as recited in claim 11 wherein the control further comprises a motor for starting and stopping the rotation of the rotation member.

13. The downhole tool as recited in claim 11 wherein the control further comprises a motor that controls the speed of rotation of the rotation member.

14. A downhole tool for wellbore operations comprising:
a substantially tubular member having a longitudinal axis, the substantially tubular member operably positionable in the wellbore; and
a rotation member rotatably disposed within the substantially tubular member, the rotation member having a passageway through which objects may pass into the wellbore, the rotation member rotating about an axis of rotation substantially perpendicular to the longitudinal axis in response to fluid flow through the passageway, the rotation member having magnetic properties such that rotation of the rotation member generates a magnetic field that produces useable power.

15. The downhole tool as recited in claim 14 wherein at least a portion of the rotation member has an airfoil shape.

16. The downhole tool as recited in claim 14 wherein the rotation member further comprises a substantially tubular rotor.

17. The downhole tool as recited in claim 14 wherein the rotation member further comprises a magnetic material.

18. The downhole tool as recited in claim 14 further comprising at least one magnet coupled to the rotation member.

19. The downhole tool as recited in claim 14 further comprising at least one magnetic pickup operably associated with the rotation member that senses the magnetic properties of the rotation member as the rotation member rotates, the magnetic pickup transforming the rotating action of the rotation member into electrical energy.

20. The downhole tool as recited in claim 14 further comprising a support member coupling the rotation member within the substantially tubular member.

21. The downhole tool as recited in claim 14 further comprising a starter rotor coupled to the rotation member and configured to assist the rotation of the rotation member within the substantially tubular member.

22. The downhole tool as recited in claim 21 wherein the starter rotor further comprises a pair of offset and curved drag members that provide resistance to fluid flow through the passageway, thereby facilitating rotation of the rotation member about the axis of rotation.

23. The downhole tool as recited in claim 14 further comprising a control adapted for activating the rotation member.

24. The downhole tool as recited in claim 23 wherein the control further comprises a motor for starting and stopping the rotation of the rotation member.

25. The downhole tool as recited in claim 23 wherein the control further comprises a motor that controls the speed of rotation of the rotation member.

26. A method for producing power within a wellbore comprising the steps of:
- rotatably positioning a rotation member having magnetic properties within a substantially tubular member in the wellbore;
- passing fluid through a passageway of the rotation member;
- rotating the rotation member about an axis of rotation that is substantially perpendicular to a longitudinal axis of the substantially tubular member in response to the fluid flow through the passageway; and
- generating a magnetic field in response to the rotation of the rotation member, thereby producing useable power.

27. The method as recited in claim 26 wherein the step of rotatably positioning the rotation member further comprises configuring at least a portion of the rotation member to have an airfoil shape.

28. The method as recited in claim 26 wherein the step of rotatably positioning the rotation member having magnetic properties further comprises magnetizing the rotation member.

29. The method as recited in claim 26 wherein the step of rotatably positioning the rotation member having magnetic properties further comprises coupling at least one magnet to the rotation member.

30. The method as recited in claim 26 further comprising the step of transforming the rotating action of the rotation member into electrical energy with at least one magnetic pickup operably associated with the rotation member.

31. The method as recited in claim 26 further comprising the step of coupling the rotation member within the substantially tubular member with a support member.

32. The method as recited in claim 26 further comprising the step of assisting the rotation of the rotation member with a starter rotor.

33. The method as recited in claim 26 further comprising the step of assisting the rotation of the rotation member with a starter rotor having a pair of offset and curved drag members that provide resistance to fluid flow through the passageway.

34. The method as recited in claim 26 further comprising the step of activating the rotation member with a control adapted for.

35. The method as recited in claim 26 further comprising the step of starting and stopping the rotation of the rotation member with a motor.

36. The method as recited in claim 26 further comprising the step of controlling the speed of rotation of the rotation member with a motor.

* * * * *